July 11, 1939.   O. SCHAERER   2,165,730
SPEED CHANGING GEAR FOR MACHINE TOOLS, ESPECIALLY LATHES
Filed March 12, 1938   2 Sheets-Sheet 1

Inventor:
O. Schaerer

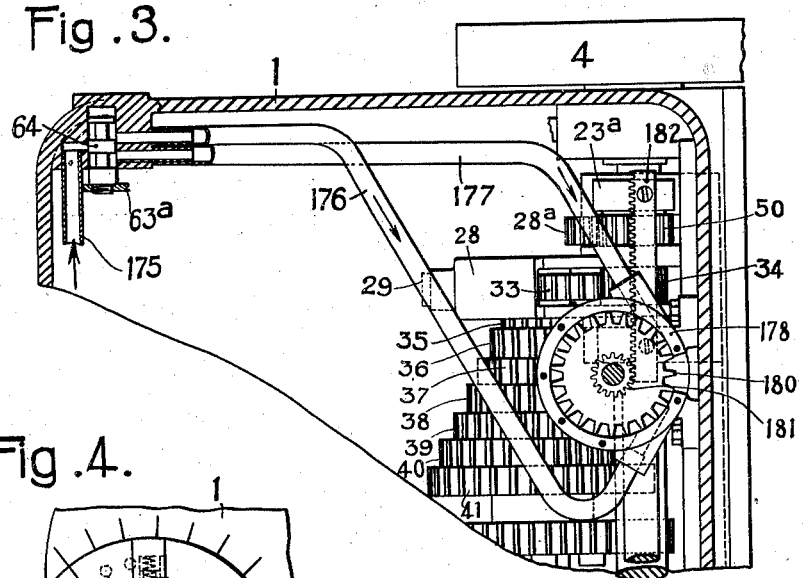
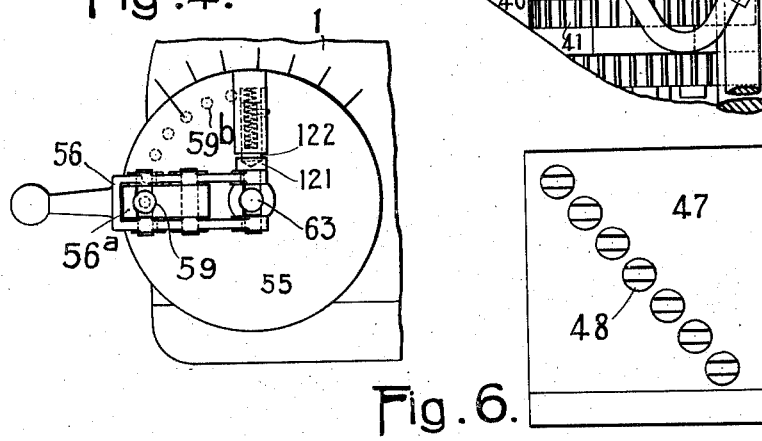
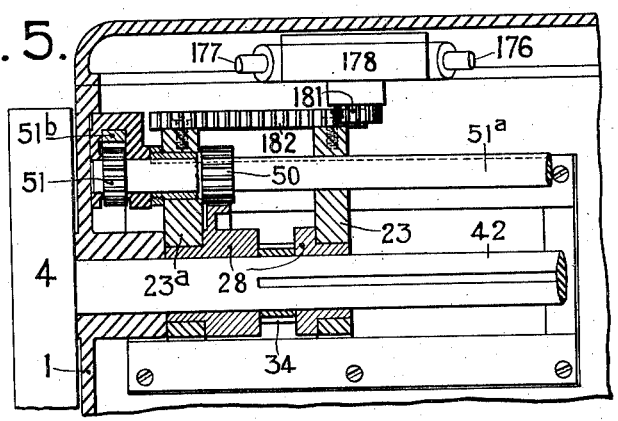

Patented July 11, 1939

2,165,730

UNITED STATES PATENT OFFICE 2,165,730

SPEED CHANGING GEAR FOR MACHINE TOOLS, ESPECIALLY LATHES

Otto Schaerer, Basel, Switzerland

Application March 12, 1938, Serial No. 195,651
In Germany March 25, 1937

4 Claims. (Cl. 74—348)

The present invention relates to a speed changing gear for machine tools, and more particularly for lathes, comprising a cone of stepped gear wheels and a rocking and sliding gear wheel cooperating therewith, the latter being rotatably mounted in a rocking support slidably arranged on and driven by the driving shaft.

The hitherto known toothed wheel speed changing gears comprising one or two sets of stepped gear wheels in many cases are provided with a rocking member or bracket slidably mounted on an auxiliary shaft and carrying one or more intermediate gear wheels. For switching the gear from a certain speed step to another, this bracket is displaced first radially outwards, then axially on the auxiliary shaft, and finally radially inwards, similar to a Norton bracket. One of the disadvantages inherent to a gear of this type consists in that it is generally impossible for the gear to be let in when the gear wheels are stationary, whereas when the said wheels rotate, there is the danger of the heads of the teeth impinging upon one another.

With the pure sliding wheel gear, on the other hand, it is impossible for a geometric scale of speeds to be obtained, as the addition of one tooth in the cooperating gear wheel is required for each tooth by which the number of teeth in the one gear wheel is reduced. Thereby the stepping rate will become either too great or too small. Apart from that the pure sliding wheel gear either requires the shaft to be constructed very long, or else the provision of a greater or smaller number of shafts arranged one behind another, and of a number of switching levers. That involves the additional disadvantage of making it impossible for the selected speed to be directly read.

The present speed change gear constitutes a combination of a rocking wheel gear and a sliding wheel gear combining in an advantageous manner the advantages of the two types of gear while avoiding their drawbacks. The stepped cone employed may comprise as great as possible a number of gear wheels of any steps closely adjacent each other and mounted on a shaft, and the sliding and rocking gear wheel is only tilted for setting the same and then like a sliding wheel slid into engagement with one of the stepped wheels.

Previously to the engagement of the teeth, the rocking support carrying the sliding and rocking pinion will assume a radially secured position fixed to the exact pitch circle distance, whereby correct engagement of the teeth is assured; this was hitherto only possible with shafts or wheels, the relative distance whereof is invariable, and even in this case it had always to be taken into consideration that the more or less long shafts might bend, which in the present gear is prevented as the positions of the rocking support are fixed bilaterally.

The speed change gear according to the present invention is characterized by the fact that in order to engage the rocking and sliding gear wheel for the speed step required, the rocking support is first brought from its disengaged position into the correct tilting position corresponding to the speed step required, and is then transferred to an axial guiding device, so that the rocking and sliding gear wheel during the remainder of the switching operation is positively slid into the step gear wheel in question in a manner similar to that occurring with a normal sliding wheel.

In order that the present invention may be readily understood, a constructional form of the invention is illustrated by way of example in the accompanying drawings in which:

Figures 2 and 3 are horizontal sections, respectively on the lines II—II and III—III of Figure 1.

Figure 4 is a front elevation view of a control device,

Figure 5 is a vertical sectional view on line V—V of Figure 1, and

Figure 6 illustrates some detail.

Figure 1:
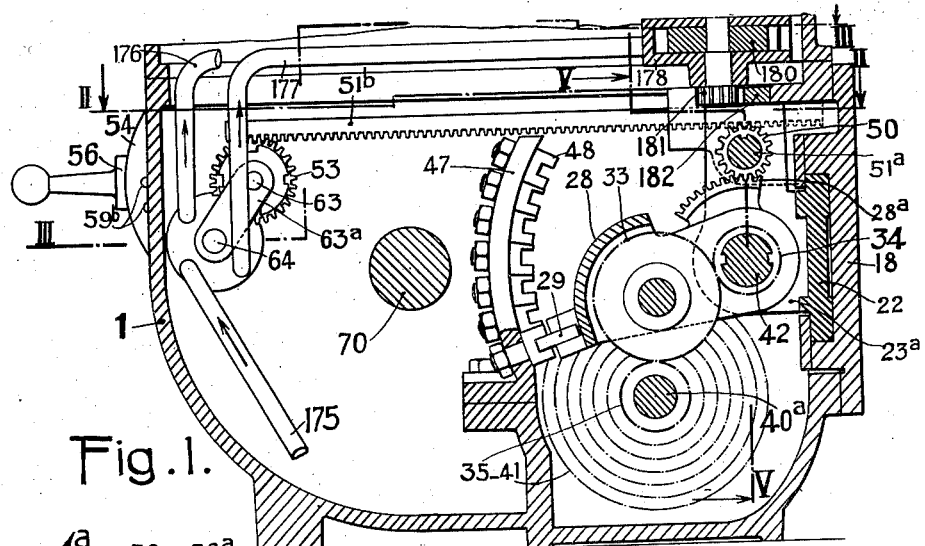
Figure 1 is a vertical section, on line I—I of Figure 2, through the change-speed gear mounted in the head stock casing of a lathe.
Figure 2:
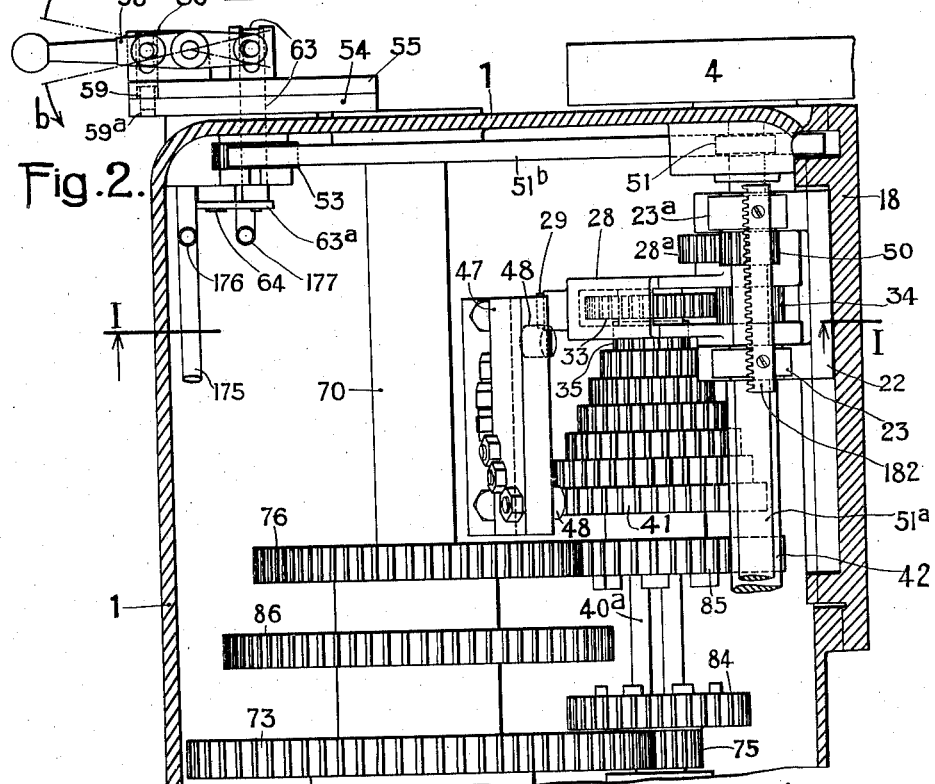

In the head stock casing 1 the main spindle 70 (Figures 1 and 2) of the lathe is mounted in a suitable manner. Behind the main spindle 70 the stepped wheel cone 35—41 splined on a shaft 40ª is arranged. By means of three pairs of wheels 85 and 76, 84 and 86, 75 and 73, or by means of any other type of gear this cone can be coupled wtih the main spindle 70 at the desired ratio of transmission.

42 is the driving shaft of the gear, and on one of its ends projecting from the head stock casing 1, a driving pulley 4 is fixed. By means of a groove and a key a driving gear wheel 34 is slidably arranged on the driving shaft 42; this driving gear wheel is in engagement with a gear wheel 33 which will in the following be referred to as rocking and sliding wheel, and which is rotatably mounted in a rocking support 28 loosely mounted on the shaft 42. In the detachable back wall 18 of the head stock casing 1 a slide 22 is slidably mounted, to which are fixed in spaced relation two bracket plates 23, 23a serving for guiding the rocking support 28. As can best be seen from Figure 5, an auxiliary shaft 51a passing through the two bracket plates 23, 23a is provided above the driving shaft 42, and a gear wheel 50 is slidably mounted on the said auxiliary shaft by means of a groove and key connection, this gear wheel being, by means of a bridge provided on it, moved by the bracket plate 23a in accordance with any displacement of the slide 22. This gear wheel 50 is in engagement with a toothed segment 28a integral with the rocking support 28. A pinion 51 engaging with a horizontally disposed rack 51b (Figure 1) is mounted on the end adjacent the driving pulley 4, of the shaft 51a.

47 is a segment plate rigidly screwed to the head stock casing 1, and to this plate a number corresponding to the number of step wheels 35—41, of hardened guiding stops 48 are arranged in a helical line in accordance with the arrangement of the said step wheels. These stops serve for supporting a support abutment 29 provided on the rocking support 28 and are so arranged that if the said abutment is engaged with the desired guiding stop 48, the rocking pivot is fixed in the corresponding rocking position in accordance with the correct pitch circuit distance. In Figure 6 a development of plate 47 with the guides 48 is shown. Preferably the guiding stops 48 are adjustably arranged, this being obtained for example by making the openings, through which extends the bolt portion of the guiding stops 48, in the form of slots.

At the outer side of the head stock casing 1 a fixed indicating dial is provided on the operator's side of the lathe, and a turntable 55 comprising a hub extending on both sides thereof is arranged to cooperate with the said fixed dial. At the end of the inwardly projecting part of the hub of disc 55 a gear wheel 53 (Figures 1 and 2) engaging into the rack 51b is mounted. At the outer side of the turntable 55 a forked switching lever 56 is rotatably mounted on a support block 56a fixed on the turntable, and a control bolt 63 and a locking bolt 59 are pivoted to said lever 56. In the index disc 55 notches 59b are arranged in a circular path into which the locking bolt 59 is adapted to engage, and which are arranged in such a manner that each of them corresponds to a predetermined tilting position of the rocking support 28. A spring actuated pin 122 (Figure 4) provided on the disc 55 normally engages into a recess 121 provided on the switching lever 56 so as to maintain the lever 56 in its normal or central position. At the inner end of the control bolt 63 a tongue 63a is secured which in its part is connected with the slide member of a slide valve 64 (Figure 3) forming part of an oil pressure apparatus. By means of this slide valve it is possible selectively to connect the supply pipe 175 opening in the casing into which this slide valve is mounted, with one or other of two pipes 176, 177. These pipes, in the manner shown in Figure 3, open tangentially into a cylindric casing 178 arranged in the upper part of the head stock casing 1, and a toothed impeller wheel 180 is rotatably mounted in the said casing which is provided with an outlet opening between the two oil admission ports. On the lower end of the vertically arranged shaft of the wheel 180 a pinion 181 is mounted which engages a rack 182 fixed on the two side plates 23, 23a.

The manner of operation of the described speed-change gear is as follows:

The control of the gear is exclusively effected from the switching lever 56, and more particularly in that the lever 56 is first tilted in the direction of the arrow a (see Figure 2) about its rotating axis in the support block 56a. Thereby it is effected that on the one hand the locking bolt 59 leaves the corresponding notch 59b, whereby the turntable 55 is unlocked in respect of rotation, and on the other hand, the control piston 63 is inwardly displaced so as to enable pressure oil to flow through pipe 176 into the impeller wheel casing 178. Hereby rotation of the impeller wheel 180 with the toothed pinion is brought about in such a direction as to displace the slide 22 and the parts carried by it in the direction towards the pulley, right to their end position in which the rocking and sliding wheel 33 is out of engagement with the stepped wheels 35—41, and in which further the rocking support can be freely tilted. Then the turntable 55 is turned by tilting the switching lever 56 about the axis of the disc, this tilting being effected for such an extent as is required for reaching a predetermined tilting position of the rocking support 28 and accordingly a predetermined speed step of the gear. Then the lever 56 is tilted in the direction of the arrow b (Figure 2) beyond its normal or central position determined by the spring pin 122, whereby the locking bolt 59 comes into engagement with the corresponding notch 59b, enabling at the same time, owing to the outward displacement of the control piston 63, pressure oil to flow through pipe 177 into the casing 178 for rotating the impeller wheel 180 in the letting-in direction thus effecting, by displacing the slide 22 in the required direction, the lateral sliding in of the rocking and sliding wheel 33 into the desired stepped wheel.

When released, the switching lever 56 will, owing to the cooperation of the spring pin 122 and the recess 121 (Figure 4) return automatically to its normal or central position. At this position of the lever 56 the two outlet ports in the casing of the slide-valve 64 are covered by the sliding member of the latter so that no oil pressure will obtain in the two pipes 176, 177 and accordingly the impeller wheel 180 and the parts which are in operative engagement therewith will remain in their assumed position without being influenced.

The switching operation explained hereinabove, namely tilting of the switching lever 56 in the direction of the arrow a, subsequent tilting of the same about the axis of the disc 55 to the desired notch 59b, and tilting of the same in the direction of the arrow b is repeated at each adjustment of the gear to the desired speed step. Therein the small tilting movement of the switching lever 56 in the direction of the arrow a brings about the releasing of the safety bolt 59 from the notch 59b in which the bolt was rested, and at the same time the actuation of the control bolt 63 and therewith the instantaneous axial displacement of the rocking support 28 with the rocking and sliding wheel 33 to its end position, whereas the tilting of the switching lever 56 about the axis of the disc 55 effects the adjustment of the tilting and sliding wheel 33 in the desired tilting position, and the displacement of the lever in the direction of the arrow b effects the lateral letting in of the rocking and sliding wheel 33 into engagement with the stepped wheel (35—41) corresponding to the tilting position of the latter.

The guiding notches 48 provided at the segment plate 47, and on the other hand the support abutment 29 on the rocking support 28 engaging in said notches, are so disposed with respect to one another that the support abutment is already inserted for some millimetres in one or other of the guiding notches, before the rocking and sliding wheel 33 comes into engagement with any of the stepped wheels 35—41; every detrimental tooth pressure acting upon the rocking support is thus already eliminated when the teeth to be slid into engagement come in contact.

The impeller wheel device is simple, inexpensive and very satisfactory in its effect because the impeller wheel operates with little friction, does not require an oil return, and further because the relatively large impeller wheel forms a suitable transmission with respect to the small pinion engaging into the rack, so that it is possible to operate with low oil pressure such as it is, at the same time, required for lubricating the gears and bearings.

The rotary movement transmitted to the stepped wheels 35—41 is transmitted in a known manner to the main spindle, by means of a simple or double gear train, sliding wheels with triple or quadruple block or the like, which in its part may be switched by means of a single lever. Thus it will be seen that with the described gear it is possible to obtain a number of speed steps (up to about 28) with the help of two switching levers only and with the possibility of a direct reading of the speed step in question.

What I claim is:

1. A speed changing gear for lathes and other machine tools, comprising a gear casing, a driving shaft and a driven shaft rotatably mounted parallel to one another in said casing, a stepped gear wheel cone fixed on one of the said shafts, a support rockably and slidably mounted on said other shaft, a pinion adapted to engage with any of the gear wheels of said cone rotatably mounted on said support, gear means for operatively connecting said pinion and the shaft on which said support is mounted and a setting mechanism for engaging said pinion into the desired gear step, the setting mechanism comprising means for the angular displacement of said support to bring the latter first from its neutral position into the position corresponding to the desired gear step and other means for the axial displacement of said support to move it thereafter in longitudinal guiding means so that the pinion on this support is, owing to its longitudinal guiding, positively slid into engagement with the gear step when the setting operation proceeds.

2. A speed changing gear as claimed in claim 1, in which the longitudinal guiding means comprise a sliding abutment on said support and a number of short counter abutments concentrically arranged in said casing with regard to the shaft on which said support is mounted so that when the said pinion is slid into engagement with a gear wheel of said cone, the sliding abutment comes into engagement with the corresponding counter abutment immediately before the pinion comes into engagement with its cooperating gear wheel.

3. A speed changing gear as claimed in claim 1, in which the means for angular displacement of said support comprise a mechanical control device, whereas the means for axial displacement of said support comprises a hydraulic control device, a movable switching handle being provided which is adapted to govern both of these devices.

4. A speed changing gear as claimed in claim 1, in which the hydraulic control device comprises an impeller wheel adapted to be operated by liquid under pressure and a pinion and rack drive adapted to transform a rotary movement of said impeller wheel into axial sliding movement of said support with respect to the said shafts.

OTTO SCHAERER.